(12) United States Patent
Gelissen

(10) Patent No.: US 6,802,075 B2
(45) Date of Patent: Oct. 5, 2004

(54) TV SIGNAL RECEIVER

(75) Inventor: Johan Hendrik Antoon Gelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 542 days.

(21) Appl. No.: 09/941,999

(22) Filed: Aug. 29, 2001

(65) Prior Publication Data

US 2002/0047941 A1 Apr. 25, 2002

(30) Foreign Application Priority Data

Sep. 5, 2000 (EP) .............................................. 00203054

(51) Int. Cl.$^7$ ................................................ H04N 7/25
(52) U.S. Cl. .......................... 725/32; 348/553; 386/46
(58) Field of Search ............................. 725/32, 33, 34, 725/35, 36, 25; 348/553, 559, 563, 564, 565, 571, 584, 586, 460, 461, 473, 474, 552; 386/48; H04N 7/25

(56) References Cited

U.S. PATENT DOCUMENTS

| | | | | |
|---|---|---|---|---|
| 5,701,161 A | * | 12/1997 | Williams et al. ............. | 348/468 |
| 5,715,014 A | * | 2/1998 | Perkins et al. ................ | 725/28 |
| 5,734,444 A | * | 3/1998 | Yoshinobu .................... | 725/14 |
| 5,873,022 A | * | 2/1999 | Huizer et al. ................ | 725/100 |
| 6,029,045 A | | 2/2000 | Picco et al. .................. | 455/5.1 |
| 6,112,007 A | * | 8/2000 | Kram ........................... | 386/46 |
| 6,320,623 B1 | * | 11/2001 | Cavallerano et al. ....... | 348/553 |
| 6,324,338 B1 | * | 11/2001 | Wood et al. .................. | 386/83 |
| 6,480,819 B1 | * | 11/2002 | Boman et al. ................. | 704/9 |

FOREIGN PATENT DOCUMENTS

| WO | WO9965237 | 6/1999 | .......... H04N/5/445 |
|---|---|---|---|
| WO | WO00049801 | 2/2000 | .......... H04N/5/445 |

* cited by examiner

Primary Examiner—Michael H. Lee

(57) ABSTRACT

The invention relates to a TV signal receiver (5) having a first input terminal (7) for receiving a first input signal, a first unit (11) for deriving a first TV signal from the first input signal, a second unit (xx) for supplying a second TV signal. A signal combination unit (19) replaces in response to a first control signal at least a part of the first TV signal by the second TV signal so as to obtain a composite TV signal. The composite TV signal is supplied to an output terminal. Control signal generator means (25) are provided for generating the first control signal. The TV signal receiver further comprises a storage device (17) for storing and reading the first TV signal so as to enable to delay the first TV signal prior to submitting the first TV signal to the signal combination unit, the storage device being adapted to suspend reading the first TV signal in response to the first control signal.

10 Claims, 1 Drawing Sheet

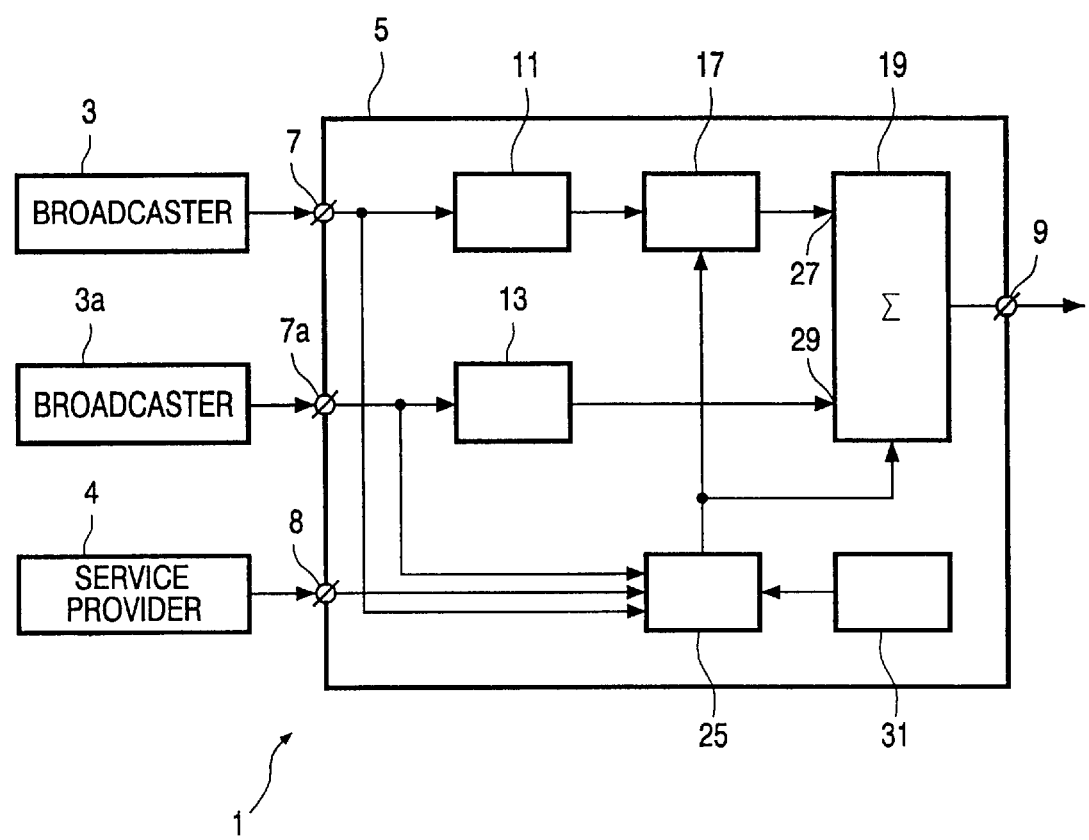

TV SIGNAL RECEIVER

The invention relates to a TV signal receiver having a first input terminal for receiving a first input signal, a first unit for deriving from the first input signal a first TV signal to be supplied to a first input of a signal combination unit, a second unit for deriving from a second input signal a second TV signal to be supplied to a second input of the signal combination unit, the signal combination unit being arranged for replacing in response to a first control signal at least a part of the signal received at its first input by the signal received at its second input so as to obtain a composite TV signal for supplying to an output of the signal combination unit, the signal combination unit further adapted to supply the signal received at its first input to the output in response to a second control signal, the output of the signal combination unit being coupled to an output of the TV signal receiver, the TV signal receiver further comprises control signal generator means for generating the first and second control signal.

The invention further relates to a method of providing a second TV signal to a customer whom is watching by means of a TV signal receiver a first TV signal, the first and second TV signal being broadcast simultaneously.

A TV receiver defined above is known from WO-98/36563 (PHN 16.230). The known TV receiver receives a first TV signal. Said first TV signal comprises TV programs of a given length and is regularly interrupted by, for example commercials or other information. The TV receiver is further arranged for receiving and storing a second TV signal. The second TV signal could comprise commercials being preferably commercials about products in which they are especially interested, information about other subjects such as, for example stock exchange news or the weather forecast or other information. The known TV receiver could output a stored second TV signal as soon as an interruption in the first TV signal occurs.

It is an object of the present invention to provide a TV signal receiver with improved capabilities to display the second TV signal.

The TV signal receiver in accordance with the invention is characterized in that the TV signal receiver further comprises a storage device (17) for storing and reading the first TV signal so as to enable to delay the first TV signal derived by the first unit prior to submitting the first TV signal to the signal combination unit, the storage device (17) being adapted to suspend reading the first TV signal in response to the first control signal and adapted to resume reading the first TV signal in response to the second control signal, the second TV signal having parameters, the control signal generator means being adapted to generated the first control signal in dependence of the parameters of the second TV signal.

The invention is based on the following recognition. Now a days, via transmission media, such as cable, terrestrial broadcasting, satellite broadcasting, the internet, a huge amount of TV signals. The TV signal could be an entire TV program, but could also be a commercial, weather forecast, police message, an item in a newscast, a highlight of a football match.

There are TV signals that a user would have watched at the time of broadcasting, if he knew when and via which channel said TV signals were broadcast. However, as he already was watching a TV program, he was not aware of the broadcasting of a TV signal of his interest and thus could not see said TV signal.

On the other hand, if the user knows when a TV signal of his interest is broadcast and he is watching another TV signal that time, he could zap to the TV signal of his interest. However, if he does so, a part of the other TV signal could not been seen as he is watching the program of is interest. So, if he was watching a movie, he could miss a very interesting part of said movie.

The TV signal receiver in accordance with the invention uses parameters, such as audio-visual content descriptors, to determine if a TV signal of a user's interest is broadcast. The second unit receives said TV signal and supplies said TV signal to the signal combination unit to enable to supply said TV signal to a display unit. The same time the TV signal of his interest is received, the first unit continues receiving the TV signal the user was watching. From now on, the first unit supplies the TV signal to a storage device. After the TV signal of his interest is broadcast, or if the user indicates he is not interested any more in said TV signal, the storage device supplies a delayed version of the TV signal to the signal combination unit. As the storage device supplies a delayed version a the TV signal, the user is able to continue watching of the TV program, he was watching prior to the broadcast of the TV signal of his interest, without missing a part of said TV program.

Preferably, the TV signal receiver comprises user actuatable input means for receiving a first command to be supplied to the control means for receiving a first command to be supplied to the control signal generator means in order to generate the second control signal. This has the advantage that the user can stop watching the second TV signal and resume watching the first TV signal if he finds the first TV signal is more interesting than the second TV signal.

In a preferred embodiment of the TV signal receiver the TV signal receiver is characterized in that the control signal generator means further being adapted to derive the first control signal in dependence of a user profile. The user profile is used to determine if the content of the TV signals supplied at the inputs of the TV signal receiver is of any interest of the user. A TV signal of interest of the user is then identified as the second TV signal. If more than one TV signals of interest are broadcast simultaneously, the user profile may be used to determine which TV signal is most interesting for the user.

In a further embodiment of the TV signal receiver the control signal generator means further being adapted to derive the first control signal from the first input signal. The first input signal could comprise more then one TV channels, such as DVB. Via each TV channel a TV signal is transmitted. Simultaneous with the various TV signals in the DVB signal, information about the content of the various TV signals is submitted. Said information is used to determine if a TV signal should be identified as the second TV signal. As the information is textual information or defined by the DVB standard, this information is suitable to derive the first control signal from the first input signal. It is even possible that said information comprises information about the content of TV signal that are transmitted via another DVB signal or via another transmission medium as the transmission medium of the first input signal.

In another embodiment of the TV signal receiver the control signal generator means derives the first control signal from a second input signal receive via a second input terminal. The second input could be connected to a service provider via a telephone line. The service provider generates information about the TV signals supplied to the TV receiver. The service provider selects those TV signals that might be of interest of the user and supplies the necessary information about those TV signals to the TV receiver. Examples of necessary information are the channel for deriving the TV signal, type of information. The service provider may supply the information via the internet.

Embodiments of the invention will now be described in more detail, by way of example, with reference to the drawings, in which FIG. 1 shows an embodiment of an arrangement in accordance with the invention.

FIG. 1 shows diagrammatically a system 1 comprising two broadcasters 3, 3a and service provider 4 and a TV signal receiver 5. In practice, more than one TV signal receiver will be connected to the broadcaster 3 and service provider 4. The TV signal receiver 5 has a first input terminal 7, a second input terminal 7a, a third input terminal 8 and an output terminal 9. The TV signals transmitted by the broadcasters 3, 3a are received at the first and second input terminal 7, 7a of the TV signal receiver 5. These signals will be further referred to as the first input signal and second input signal. The first and second input signal comprises TV programs, newscast, commercials, stock exchange news, the weather forecast or other information. The first input terminal and second input terminal may be connected to the broadcaster via a cable connection, terrestrial connection or satellite connection. The first input signal relates to the first TV signal, in other words, the main program. The second input signal relates to the second TV signal. The second TV signal is a TV signal that is transmitted simultaneously as the first TV signal and comprises content that is of special interest for the user. The second TV signal may be a newscast, an item of a newscast, a commercial, weather forecast or any other interesting part of a TV program.

The first input signal received at the input terminal 7 is applied to a first unit 11. The first unit 11 comprises a tuner for selecting a first TV signal from the presented first TV signals in the first signal. The first TV signal is applied to a first input 27 of a signal combination unit 19 via a storage device 17. The storage device 17 functions as a FIFO buffer and enables to delay the first TV signal. The storage device 17 comprises preferably a direct access device, such as a Hard Disk Drive. In the event the storage device enables a time-delay or time-shift, the first TV signal is written in a memory and read from said memory after some time. In the event the storage device does not delay the first input signal, the storage device writes the first TV signal in the memory and directly reads it from the memory and supplies the first TV signal to an output of the storage device 17.

The second input signal received at the second input terminal 7a is applied to a second unit 13. The second unit 13 derives a second TV signal from the second input signal. It should be mentioned that the second input signal may be the same as the first input signal, as the first input signal could comprises more than one TV signal. The second TV signal is applied to a second input 29 of the signal combination unit 19.

The control unit 25 is adapted to generate a first control signal in response to a signal indicating that the second TV signal is received at the second input terminal 7a. In the event the first control signal is present, the storage device suspends reading the first TV signal from the memory. As soon as the first control signal disappears, the storage device 17, resumes reading from the memory and accordingly supplies to the signal combination unit 19 a first TV signal that has a time-delay which is equivalent to the duration of the first control signal. The signal combination unit 19 is adapted to replace a part of the first TV signal by the second TV signal so as to obtain a composite TV signal in response to said first control signal. The composite TV signal is applied to an output terminal 9 of the TV signal receiver. On a display device, not shown and not necessary a part of the TV signal receiver, the composite TV signal is reproduced.

The functioning of the TV signal receiver will now be described in greater detail. The first input signal is received at the input 7. The unit 11 derives a first TV signal from the first input signal. The first TV signal is passed through the storage unit 17 and supplied to the signal combination unit 19. The pass through the storage unit 17 may introduce a delay of the first TV signal. There is no delay as long as there have not been the first control signal. In the event of the absence of the first control signal the signal combination unit 19 supplies the first TV signal to the output of the TV signal receiver for reproduction on a display unit. Most of the time an user uses the TV signal receiver, the receiver is in this state.

However, as a user is watching a TV signal, he is not able to watch simultaneously with full attention other TV signals supplied to the TV signal receiver. To enable the possibility to view another TV signal at the time of broadcast, the TV signal receiver comprises control signal means 25 and a second unit 13 for deriving a second TV signal. The control signal generator unit 25 is adapted to retrieve information about the TV signals supplied to the input of the TV signal receiver. Said information may be additional information in the input signal, for example, the program guide in teletekst or a DVB channel. A DVB channel may even comprise dedicated information about the content of the TV programs, the so-called audio-visual content descriptions, such as program type, actors, producer etc. However, other methods of receiving said information are suitable. So could the information be obtained from the internet or could be supplied by a service provider.

An intelligent agent, which is part of the control signal generator unit, retrieves said information and analysis the information if TV signals are broadcast which could be of interest for the user. A user profile could be used to determine the needs of a user. For example, a user who wants to view all the police messages, which are broadcast and that could be viewed via the TV signal receiver. It this case the agent detects the broadcast of the police message and the control signal generator unit generates in response to said detection the first control signal. The control signal generator unit provides further signals to enable the unit to derive the second TV signal being the police message from the input signals supplied to the TV signal receiver. The second unit 13 supplies the second TV signal to the signal combination unit 19.

In response to the first control signal the storage device 17 suspends reading the first TV signal from the memory in the storage device. The TV signal that is supplied to the signal combination unit in response to the first control signal, preferably comprises a repetition of the last image of the TV signal supplied to the signal combination unit 19. However any other type of image could be suitable.

The signal combination unit 19 may be adapted to replace in response to the first control signal the repetitive images in the first TV signal by the images of the second TV signal. However the signal combination unit could also be adapted to generate a composite signal comprising images, whereby the images of the second TV signal block replace only a part of the images of the first TV signal, for example, as a picture in picture image.

In response to a second control signal the storage unit 17 resumes reading the stored first TV signal. The signal combination unit 19 is adapted to supply in response to the second control signal the signal applied to the first input (27).

In short, the control signal generator unit 25 monitors the content of all TV signals simultaneously supplied to the TV signal receiver. As soon as a TV signal is supplied which is of interest for the user, the unit 13 is tuned to derive said TV signal from the input signals. Said TV signal is supplied to the output to be displayed. In the mean time said TV signal is displayed, the TV signal, comprising a main program the user was watching, is stored in the storage device 17 and the storage device stops outputting the main program. After the TV signal that is of interest for the user is displayed, the storage device resumes the outputting of the main program to the signal combination unit. In this way the user is able see an interesting TV program at the time of broadcast without losing the part of a TV program he was watching and that is broadcast simultaneously.

The control signal generator unit 25 could retrieve information about the TV signals supplied to its inputs not only from the input signal its self but may retrieve said information via a service provider 4, which supplies said information to a third input terminal 8 of the TV signal receiver. The service provider could prior to submitting the information of the TV signals to the TV signal receiver make a pre-selection in dependence of the needs of the user. The connection between the service provider and the TV signal receiver has further advantages. The service provider could send his services via a broadcast channel. The service provider could send for example, real time stock market news, announcements of events, such as concerts. He also has the possibility to send via said broadcast channel commercials that have a relationship TV programs, for example send car commercials when a TV program about car races is broadcast. The later gives advertisers the possibility to present their advertisement to persons who are interested in cars, otherwise that user was not watching the TV program about car races.

The TV signal receiver comprises preferably user actuatable input means (31). The user actuatable input means may be in the form of a remote control or buttons on the TV receiver. However, said input means may be voice controlled. The user actuatable input means are adapted to receive a first command. The first command is supplied to the control signal generator means, which generates in response to the first command the second control signal. By means of said input means a user should not wait for the end of the second TV signal, which is a TV program that is assumed to be of interest at that time. By supplying the first command, the user is able to resume watching the first TV signal, which is the program he was watching, if he finds the second TV signal not interesting enough.

Though the invention is described with reference to a preferred embodiment thereof, it is to be understood that this is non-limitative examples. Thus, various modifications are conceivable to those skilled in the art, without departing from the scope of the invention, as defined by the claims. As an example, the selection criteria to select a TV signal to be inserted in the first TV signal could be dependent on the content of the first TV signal. For example: If a user is watching a program about cars this is an indication the user is interested in cars. This indication could be used to suspend said program about cars as soon as a commercial about cars is broadcast via another channel.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

What is claimed is:

1. A TV signal receiver (5) having a first input terminal (7) for receiving a first input signal, a first unit (11) for deriving from the first input signal a first TV signal to be supplied to a first input (27) of a signal combination unit (19), a second unit (13) for deriving from a second input signal a second TV signal to be supplied to a second input (29) of the signal combination unit (19), the signal combination unit (19) being arranged for replacing in response to a first control signal at least a part of the signal received at its first input by the signal received at its second input so as to obtain a composite TV signal for supplying to an output of the signal combination unit (19), the signal combination unit further adapted to supply the signal received at its first input to the output in response to a second control signal, the output of the signal combination unit being coupled to an output (9) of the TV signal receiver, the TV signal receiver further comprises control signal generator means (25) for generating the first and second control signal, characterized in that the TV signal receiver further comprises a storage device (17) for storing and reading the first TV signal so as to enable to delay the first TV signal derived by the first unit prior to submitting the first TV signal to the signal combination unit, the storage device (17) being adapted to suspend reading the first TV signal in response to the first control signal and adapted to resume reading the first TV signal in response to the second control signal, the second TV signal having parameters, the control signal generator means being adapted to generated the first control signal in dependence of the parameters of the second TV signal.

2. A TV signal receiver as claimed in claim 1, characterized in that the control signal generator means is adapted to generate the second control signal after the second TV signal has been transmitted.

3. A TV signal receiver as claimed in claim 1, characterized in that the TV signal receiver further comprises user actuatable input means (31) for receiving a first command to be supplied to the control signal generator means in order to generate the second control signal.

4. A TV signal receiver as claimed in claim 1, characterized in that the control signal generator means further being adapted to derive the first control signal in dependence of a combination of the parameters and a user profile.

5. A TV signal receiver as claimed in claim 1, characterized in that the control signal generator means is further adapted to derive the first control signal from the first input signal.

6. A TV signal receiver as claimed in claim 1, characterized in that the control signal generator means further being adapted to derive the first control signal from a second input signal received at a second input terminal.

7. A TV signal receiver as claimed in claim 1, characterized in that the second unit is adapted to derive the second TV signal from the first input signal.

8. A TV signal receiver as claimed in claim 1, characterized in that the TV signal receiver comprises a third input terminal for receiving a third input signal and the second unit is further adapted to derive the second TV signal from the third input signal.

9. A TV signal receiver as claimed in claim 1, characterized in that storage device comprises a hard disk drive.

10. A method of providing a second TV signal to a customer whom is watching by means of a TV signal receiver a first TV signal that is broadcast, the method comprises the steps of:

supplying second TV signals to the TV signal receiver, supplying information about the content of the second TV signals to the TV signal receiver, analyzing the information by means in the TV signal receiver and determining whether one of the second TV signals supplied simultaneously with the first TV signal should be displayed to the user, in the case the second TV signal should be displayed:

suspending the outputting of the first TV signal to the output of the TV signal receiver storing the first TV signal in a storage device in the TV signal receiver receiving the second TV signal to be displayed and supplying said second TV signal to an output of the TV signal receiver, determining by means in the TV signal the end of the second TV signal, resuming displaying the first TV signal by reading said signal from the storage device.

* * * * *